United States Patent
Wilson, Jr.

(10) Patent No.: US 10,252,807 B2
(45) Date of Patent: Apr. 9, 2019

(54) RUNBACK CONTROL

(71) Applicant: Goodrich Corporation, Charlotte, NC (US)

(72) Inventor: Tommy M. Wilson, Jr., Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 220 days.

(21) Appl. No.: 15/205,446

(22) Filed: Jul. 8, 2016

(65) Prior Publication Data

US 2018/0009538 A1 Jan. 11, 2018

(51) Int. Cl.

| B64D 15/16 | (2006.01) |
|---|---|
| B64C 1/14 | (2006.01) |
| B64C 3/00 | (2006.01) |
| B64C 5/00 | (2006.01) |
| B64C 11/00 | (2006.01) |
| B64C 39/12 | (2006.01) |
| B64D 15/12 | (2006.01) |
| B64D 29/00 | (2006.01) |
| B64D 15/00 | (2006.01) |

(52) U.S. Cl.
CPC ............ B64D 15/16 (2013.01); B64C 1/1476 (2013.01); B64C 3/00 (2013.01); B64C 5/00 (2013.01); B64C 11/00 (2013.01); B64C 39/12 (2013.01); B64D 15/00 (2013.01); B64D 15/12 (2013.01); B64D 29/00 (2013.01)

(58) Field of Classification Search
CPC ......... B64D 15/16; B64D 15/00; B64D 15/12
See application file for complete search history.

(56) References Cited

U.S. PATENT DOCUMENTS

| 2,762,897 A * | 9/1956 | Vrooman ............... B64D 15/12 |
| | | 219/202 |
| 3,463,418 A | 8/1969 | Miksch |
| 5,322,246 A | 6/1994 | Henne et al. |
| 5,921,502 A * | 7/1999 | Al-Khalil ............ B64D 15/163 |
| | | 244/134 A |

(Continued)

FOREIGN PATENT DOCUMENTS

| EP | 2862804 A1 | 4/2015 |
| FR | 3025741 A1 | 3/2016 |
| WO | WO-1984/03867 A1 | 10/1984 |

OTHER PUBLICATIONS

Extended European Search Report dated Dec. 1, 2017 issued during the prosecution of corresponding European Patent Application No. EP 17180370.3 (8 pages).

*Primary Examiner* — Brian M O'Hara
*Assistant Examiner* — Keith L Dixon
(74) *Attorney, Agent, or Firm* — Locke Lord LLP; Scott D. Wofsy; Joshua L. Jones

(57) ABSTRACT

An ice protection system includes an aircraft surface and a gutter defined in the aircraft surface between raised rails. The gutter includes a mouth that narrows into a trailing portion of the gutter. The mouth is configured to channel water runback rivulets into the trailing portion of the gutter. The gutter can be a first gutter of a plurality of side by side gutters, each including a respective mouth narrowing into a respective trailing portion, wherein the gutters are separated from one another by respective rails.

13 Claims, 3 Drawing Sheets

(56) References Cited

U.S. PATENT DOCUMENTS

| | | | | | |
|---|---|---|---|---|---|
| 6,279,856 | B1* | 8/2001 | Rutherford | ............ | B64D 15/14 |
| | | | | | 244/134 D |
| 7,278,610 | B2* | 10/2007 | Giamati | .................... | B64C 9/24 |
| | | | | | 244/134 D |
| 8,578,747 | B2* | 11/2013 | Li | .......................... | B21B 1/227 |
| | | | | | 244/200 |
| 9,827,735 | B2* | 11/2017 | Schmidt | .................... | B32B 7/02 |
| 2007/0031639 | A1* | 2/2007 | Hsu | ........................ | B05D 5/08 |
| | | | | | 428/141 |
| 2008/0029648 | A1* | 2/2008 | Giamati | .................... | B64C 9/24 |
| | | | | | 244/134 D |
| 2010/0127125 | A1* | 5/2010 | Li | .......................... | B21B 1/227 |
| | | | | | 244/119 |
| 2011/0151186 | A1* | 6/2011 | Lambourne | .......... | C08G 77/385 |
| | | | | | 428/141 |
| 2011/0198444 | A1* | 8/2011 | Dong | .................... | B64C 23/06 |
| | | | | | 244/130 |
| 2016/0114883 | A1* | 4/2016 | Guerry | .................. | B08B 17/065 |
| | | | | | 244/200 |

* cited by examiner

RUNBACK CONTROL

BACKGROUND OF THE INVENTION

1. Field of the Invention

The present disclosure relates to ice protection systems, and more particularly to such systems as used in aerospace applications.

2. Description of Related Art

Runback ice forms aft of heated zones on thermal ice protection systems, e.g., on aircraft wings and empennage. This is due to water flowing aft after ice has shed and the surface has yet to cool. Runback ice can form in a ridge which can potentially affect lift, drag, and aircraft flying characteristics. Various methods can be used to control runback ice formation in an electrical or hot air heated system, but these may result in higher power consumption.

Such conventional methods and systems have generally been considered satisfactory for their intended purpose. However, there is still a need in the art for improved runback control. The present disclosure provides a solution for this need.

SUMMARY OF THE INVENTION

An ice protection system includes an aircraft surface and a gutter defined in the aircraft surface between raised rails. The gutter includes a mouth that narrows into a trailing portion of the gutter. The mouth is configured to channel water runback rivulets into the trailing portion of the gutter.

The gutter can be a first gutter of a plurality of side by side gutters, each including a respective mouth narrowing into a respective trailing portion, wherein the gutters are separated from one another by respective rails. The aircraft surface can be a surface of an airfoil, wherein the airfoil includes a leading edge and a trailing edge with the aircraft surface extending at least part way between the leading edge and the trailing edge. The gutter can extend in a direction from the leading edge to the trailing edge. The aircraft surface can include at least one of a parting strip or a shedding zone forward of the mouth of the gutter.

The gutter can include at least one of an ice phobic or hydrophobic surface material for prevention of ice formation in the gutter. It is also contemplated that the gutter can include a heater configured to locally heat the gutter for prevention of ice formation in the gutter. For example each gutter in a plurality of gutters can include a respective heater configured to locally heat the gutter for prevention of ice formation in the gutter, and the heaters of the gutters can be spaced apart so areas of the aircraft surface between the gutters is free of heaters. The gutter can terminate at a tube leading under a wing surface for removing water to a drain either through natural or induced suction, wherein the tube is heated to prevent freezing The trailing portion of the gutter can terminate at a protrusion that protrudes above an area of the aircraft surface adjacent to the protrusion for shedding a runback rivulet away from the aircraft surface. The gutter can have a depth of between 0.0005 inches to 0.007 inches relative to the rails.

The aircraft surface can be configured to be mounted to an airframe over an underlying aerodynamic surface. It is also contemplated that the aircraft surface can be formed directly as an aerodynamic surface of an air frame. The aircraft surface can be configured as part of at least one of a wing, empennage, a cowl, a propeller or fan blade, a canard, a windshield, or the like.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
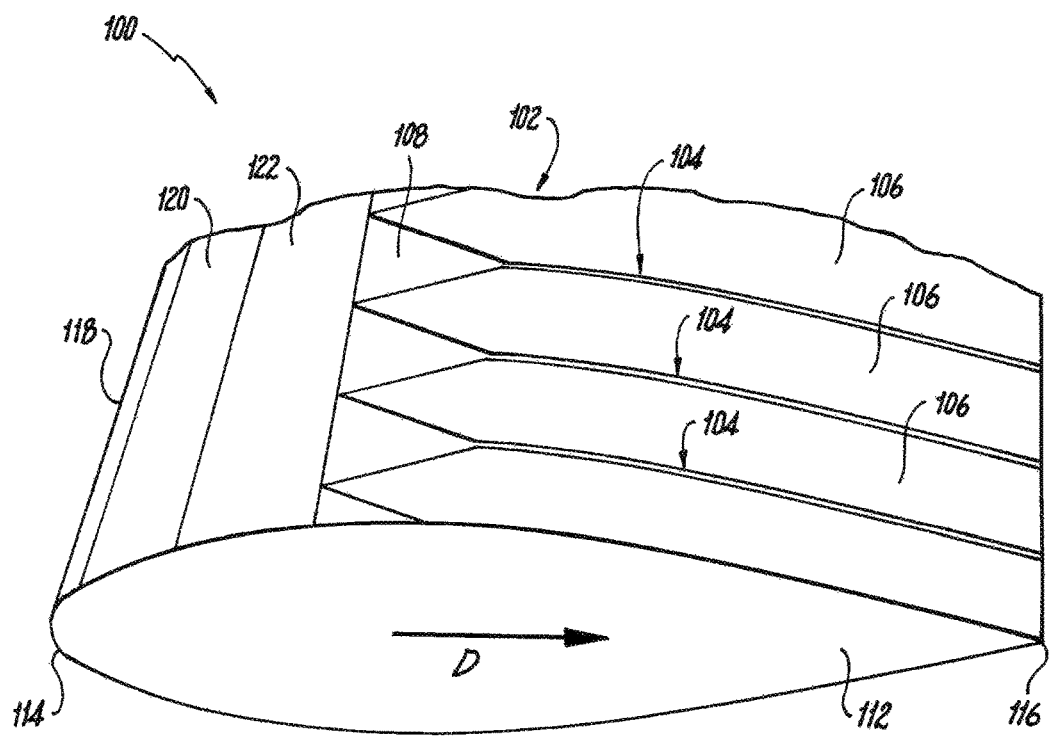
FIG. 1 is a schematic perspective view of an exemplary embodiment of an aircraft surface constructed in accordance with the present disclosure, showing the gutters for runback control.

Reference will now be made to the drawings wherein like reference numerals identify similar structural features or aspects of the subject disclosure. For purposes of explanation and illustration, and not limitation, a partial view of an exemplary embodiment of an aircraft surface in accordance with the disclosure is shown in FIG. 1 and is designated generally by reference character 100. Other embodiments of aircraft surfaces in accordance with the disclosure, or aspects thereof, are provided in FIGS. 2-8, as will be described. The systems and methods described herein can be used to control icing runback.

Ice protection system 100 includes an aircraft surface 102 and a gutter 104 defined in the aircraft surface 102 between raised rails 106. The gutter 104 includes a mouth 108 that narrows into a trailing portion 110 of the gutter 104. The mouth 108 is configured to channel water runback rivulets into the trailing portion 110 of the gutter 104. There are a plurality of side by side gutters 104, each including a respective mouth 108 narrowing into a respective trailing portion 110, however for sake of clarity mouth 108 and trailing portion 110 are only identified on one of the channels 104. The gutters 104 are separated from one another by respective rails 106. The exemplary aircraft surface 102 is a surface of an airfoil 112. The airfoil 112 includes a leading edge 114 and a trailing edge 116, wherein the aircraft surface 102 extends at least part way between the leading edge 114 and the trailing edge 116. The gutter 104 extends in a direction D from the leading edge 114 to the trailing edge 116. The aircraft surface 102 can includes a parting strip 118, configured for continuous heating above freezing for ice protection, and one, two, or more shedding zones 120 and 122 configured for cyclical heating to periodically remove accumulated ice.

Figure 2:
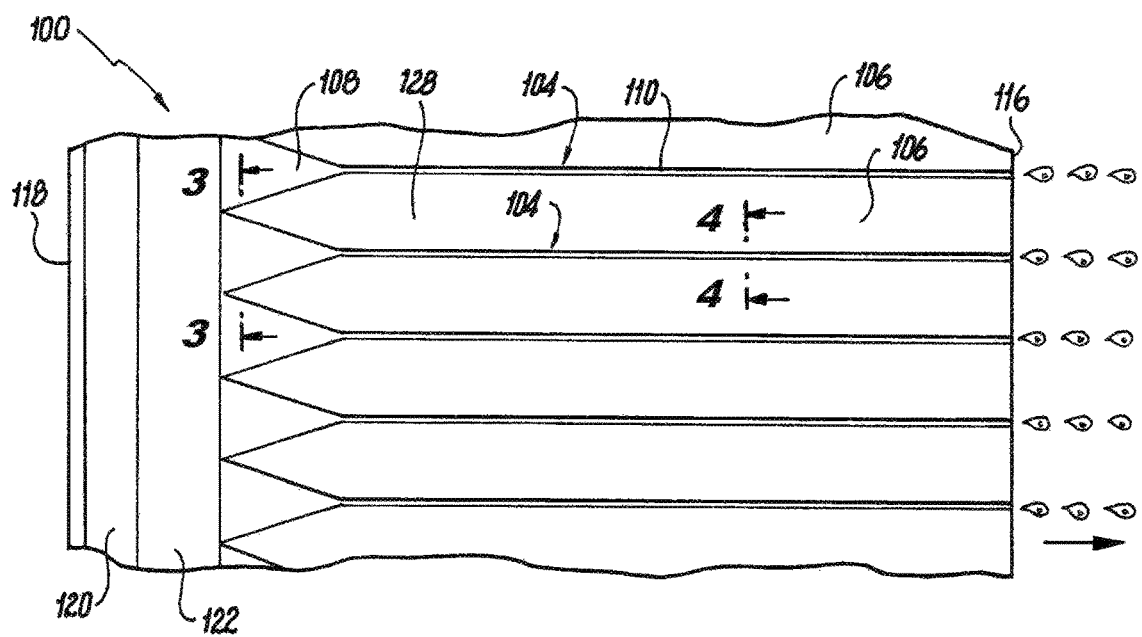
FIG. 2 is a schematic plan view of the aircraft surface of FIG. 1, showing the mouth and trailing portions of the gutters.
Figure 3:
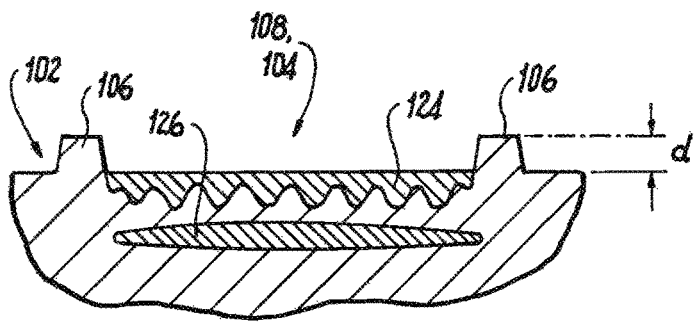
FIG. 3 is a schematic cross-sectional view of the aircraft surface of FIG. 1, showing the cross-section of the mouth of one of the gutters.
Figure 4:
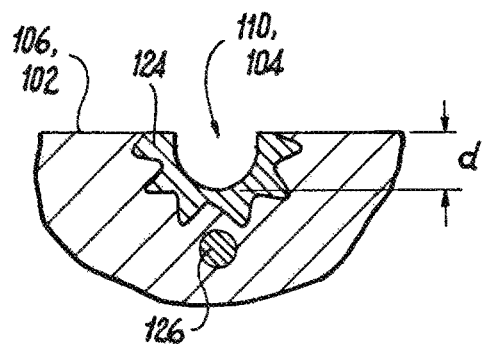
FIG. 4 is a schematic cross-sectional view of the aircraft surface of FIG. 1, showing the cross-section of the trailing portion of one of the gutters.

As shown in FIG. 2, the parting strip 118 and shedding zones 120 and 122 are located forward of the mouths 108 of the gutter 104 so that runback water will form into rivulets in mouths 108, and the rivulets will be directed through trailing portions 110 of the gutters 104. The gutters 104 can extend all of the way to the trailing edge 116, and as indicated by the droplets in FIG. 2, the rivulets can be shed from aircraft surface 102 at the trailing edge 116. FIG. 3 shows the cross-section of one of the mouths 108 between rails 106, and FIG. 4 shows the narrower trailing portion 110 aft of the mouth 108. The mouths 108 act as funnels to collect moisture from parting strip 118 and shedding zones 120 and 122, forming the rivulets which are guided along trailing portions 110 of the gutters 104. The gutter 104 can have a depth d of between 0.0005 inches to 0.007 inches relative to the rails 106, or any other suitable depth tailored for a given application. The depth d can be small enough to have little or no effect on aerodynamics.

With continued reference to FIG. 4, the gutter 104 can include a surface material 124 that is ice phobic and/or hydrophobic for prevention of ice formation in the gutter 104, and the rails can be of a non-hydrophobic/non-ice phobic material. It is also contemplated that the gutter 104 can include a heater 126 configured to locally heat the gutter 104 for prevention of ice formation in the gutter. For example each gutter 140 in the plurality of gutters 104 of FIG. 2 can include a respective heater 126 (not shown in FIG. 2, but see FIG. 4) configured to locally heat the gutter 104 for prevention of ice formation in the gutter 104, and the heaters 126 of the gutters can be spaced apart so areas 128 of the aircraft surface 102 between the gutters 104 are free of heaters 126. Thus only a small area of aircraft surface 102 needs to be heated and/or hydrophobic/ice phobic compared to traditional ice protection systems employing heaters or hydrophobic/ice phobic surface materials. It is possible for heaters 126 to be effective, even with relatively low power, as all they need to accomplish is to prevent the water in rivulets from freezing in gutters 104. The heaters 126 and or surface material 124 can extend into mouths 108 as indicated in FIG. 3.

Figure 5:
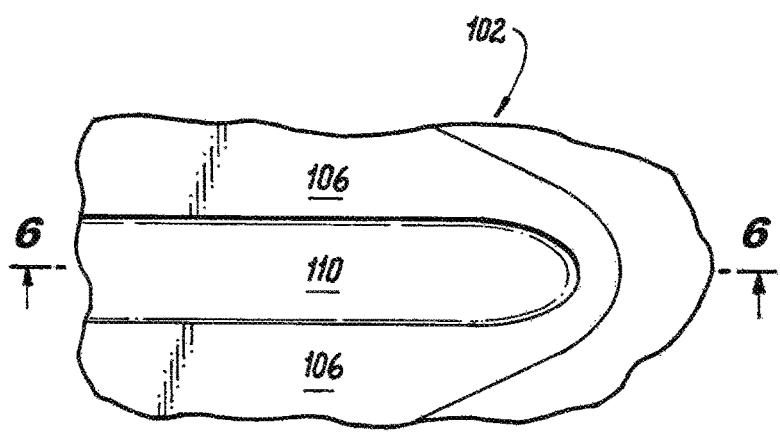
FIG. 5 is a schematic plan view of a portion of an exemplary embodiment of an aircraft surface, showing a trailing portion of a gutter terminating in a protrusion for shedding runback rivulets from the aircraft surface.
Figure 6:
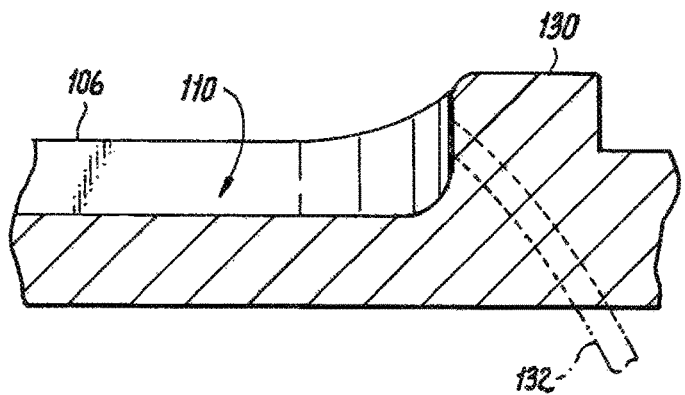
FIG. 6 is a schematic cross-sectional elevation view of the aircraft surface of FIG. 5, showing the protrusion extending above the surrounding surface.
Figure 7:
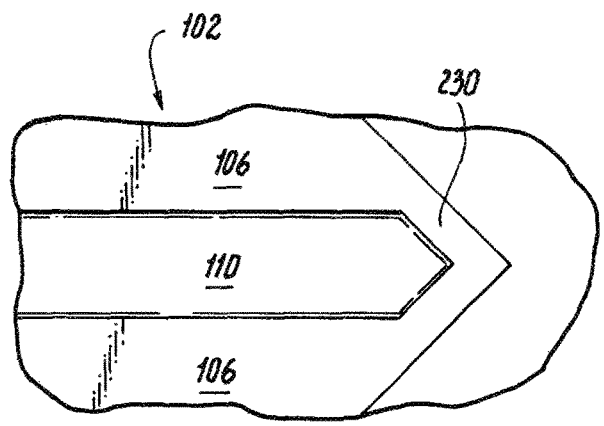
FIG. 7 is a schematic plan view of a portion of another exemplary embodiment of a protrusion for shedding runback rivulets, wherein the protrusion is triangular.

With reference now to FIGS. 5-6, the trailing portion 110 of each gutter 104 can terminate at a protrusion 130 that protrudes above an area of the aircraft surface 102 adjacent to the protrusion 130 for shedding a runback rivulet away from the aircraft surface 102. As shown in FIG. 5, the protrusion 130 is curvilinear, however as shown in FIG. 7 another embodiment of protrusion 230 is v-shaped, and those skilled in the art will readily appreciate that any other suitable protrusion shape can be used without departing from the scope of this disclosure. As indicated schematically in FIG. 6, the gutter 110 can optionally terminate at a tube 132 leading under a wing surface for removing water to a drain either through natural or induced suction, wherein the tube 132 is heated to prevent freezing. The tube 132 can be used in addition to or in lieu of protrusion 130.

Figure 8:
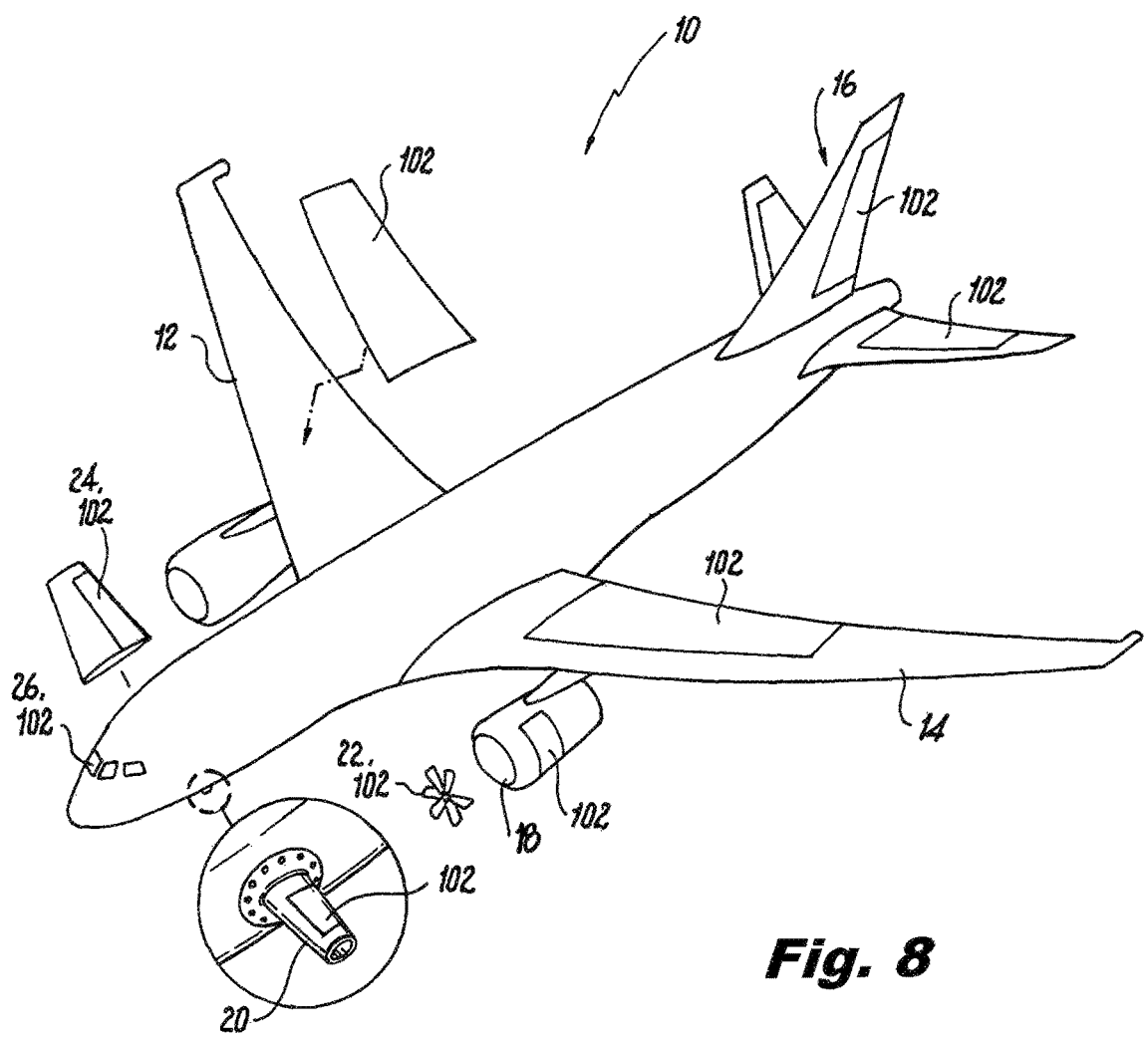
FIG. 8 is a schematic perspective view of an aircraft, showing various exemplary locations for aircraft surfaces constructed in accordance with the present disclosure.

Referring now to FIG. 8, the aircraft surface 102 can be configured to be mounted to an airframe 10 over an underlying aerodynamic surface 12 as indicated by the large arrow on FIG. 8. It is also contemplated that the aircraft surface 102 can be formed directly as an aerodynamic surface of an air frame, e.g. as in the aircraft surface 102 shown formed directly on wing 14 in FIG. 8. The aircraft surface 102 can be configured as part of at least one of a wing 14, empennage 16, a cowl 18, or a fairing 20 such as for a drain, sensor, propeller or fan blade 22, canard 24, windshield 26, or the like.

The methods and systems of the present disclosure, as described above and shown in the drawings, provide for icing runback control with superior properties including reduced power requirements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An ice protection system comprising:
an aircraft surface; and
a gutter defined in the aircraft surface between raised rails, wherein the gutter includes a mouth that narrows into a trailing portion of the gutter, wherein the mouth is configured to channel water runback rivulets into the trailing portion of the gutter, wherein the gutter is a first gutter of a plurality of side by side gutters, each including a respective mouth narrowing in a direction from a leading edge to a trailing edge of the aircraft surface into a respective trailing portion, wherein the gutters are separated from one another by respective rails.

2. An ice protection system as recited in claim 1, wherein the aircraft surface is a surface of an airfoil, wherein the airfoil includes a leading edge and a trailing edge with the aircraft surface extending at least part way between the leading edge and the trailing edge.

3. An ice protection system as recited in claim 1, wherein the aircraft surface includes at least one of a parting strip or a shedding zone forward of the mouth of the gutter.

4. An ice protection system as recited in claim 1, wherein the gutter includes at least one of an ice phobic or hydrophobic surface material for prevention of ice formation in the gutter.

5. An ice protection system as recited in claim 1, wherein the gutter includes a heater configured to locally heat the gutter for prevention of ice formation in the gutter.

6. An ice protection system as recited in claim 1, wherein the gutter terminates at a tube leading under a wing surface for removing water to a drain either through natural or induced suction, wherein the tube is heated to prevent freezing.

7. An ice protection system comprising:
an aircraft surface; and
a gutter defined in the aircraft surface between raised rails, wherein the gutter includes a mouth that narrows into a trailing portion of the gutter, wherein the mouth is configured to channel water runback rivulets into the trailing portion of the gutter, wherein the trailing portion of the gutter terminates at a protrusion that protrudes above an area of the aircraft surface adjacent to the protrusion for shedding a runback rivulet away from the aircraft surface.

8. An ice protection system as recited in claim 1, wherein the gutter has a depth of between 0.0005 inches to 0.007 inches relative to the rails.

9. An ice protection system as recited in claim 1, wherein each gutter includes a respective heater configured to locally heat the gutter for prevention of ice formation in the gutter.

10. An ice protection system as recited in claim 9, wherein the heaters of the gutters are spaced apart so areas of the aircraft surface between the gutters is free of heaters.

11. An ice protection system as recited in claim 1, wherein the aircraft surface is configured to be mounted to an airframe over an underlying aerodynamic surface.

12. An ice protection system as recited in claim 1, wherein the aircraft surface is formed directly as an aerodynamic surface of an air frame.

13. An ice protection system as recited in claim 1, wherein the aircraft surface is configured as part of at least one of a wing, empennage, a cowl, a propeller or fan blade, a canard, or a windshield.

* * * * *